(12) United States Patent
Okuyama

(10) Patent No.: US 11,292,492 B2
(45) Date of Patent: Apr. 5, 2022

(54) DRIVING ASSISTANCE METHOD AND DRIVING ASSISTANCE DEVICE

(71) Applicants: Nissan Motor Co., Ltd., Yokohama (JP); Renault S.A.S., Boulogne-Billancourt (FR)

(72) Inventor: Takeshi Okuyama, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 135 days.

(21) Appl. No.: 16/648,998

(22) PCT Filed: Sep. 26, 2017

(86) PCT No.: PCT/JP2017/034781
§ 371 (c)(1),
(2) Date: Mar. 19, 2020

(87) PCT Pub. No.: WO2019/064349
PCT Pub. Date: Apr. 4, 2019

(65) Prior Publication Data
US 2020/0283027 A1 Sep. 10, 2020

(51) Int. Cl.
*B60W 60/00* (2020.01)
*B60W 10/18* (2012.01)
(Continued)

(52) U.S. Cl.
CPC ........ *B60W 60/0053* (2020.02); *B60W 10/18* (2013.01); *B60W 10/20* (2013.01);
(Continued)

(58) Field of Classification Search
CPC .. B60W 60/0053; B60W 10/18; B60W 10/20; B60W 30/18163; B60W 2554/402; B60W 2555/20; B60W 2552/10; B60W 2554/802; B60W 30/18154; B60W 50/082; B60W 2554/40; B60W 30/14;
(Continued)

(56) References Cited

U.S. PATENT DOCUMENTS

2016/0214612 A1    7/2016   Kashiba et al.

FOREIGN PATENT DOCUMENTS

JP    2015-141560 A    8/2015
JP    2016-017758 A    2/2016
(Continued)

OTHER PUBLICATIONS

Machine Translation of JP2017/019397 (Year: 2017).*

*Primary Examiner* — Alan D Hutchinson
(74) *Attorney, Agent, or Firm* — Young Basile Hanlon & MacFarlane, P.C.

(57) ABSTRACT

A driving assistance method includes: extracting a high difficulty point where autonomous driving is difficult on a planned travel route of a host vehicle; determining, at a point located at a predetermined distance or more before the high difficulty point, whether or not a following vehicle traveling on the same lane as a lane of the host vehicle is present within a predetermined range from the host vehicle; and guiding switching of a traveling state of the host vehicle from autonomous driving to manual driving when the following vehicle is present within the predetermined range from the host vehicle.

8 Claims, 9 Drawing Sheets

(51) Int. Cl.
*B60W 10/20* (2006.01)
*B60W 30/18* (2012.01)

(52) U.S. Cl.
CPC . *B60W 30/18163* (2013.01); *B60W 2554/402* (2020.02); *B60W 2555/20* (2020.02)

(58) Field of Classification Search
CPC ...... B60W 40/04; B60W 40/06; B60W 50/14; G08G 1/167; G08G 1/16; G01C 21/26; B60R 21/0134
See application file for complete search history.

(56) References Cited

FOREIGN PATENT DOCUMENTS

| | | |
|---|---|---|
| JP | 2016-132421 A | 7/2016 |
| JP | 2017-019397 A | 1/2017 |

* cited by examiner

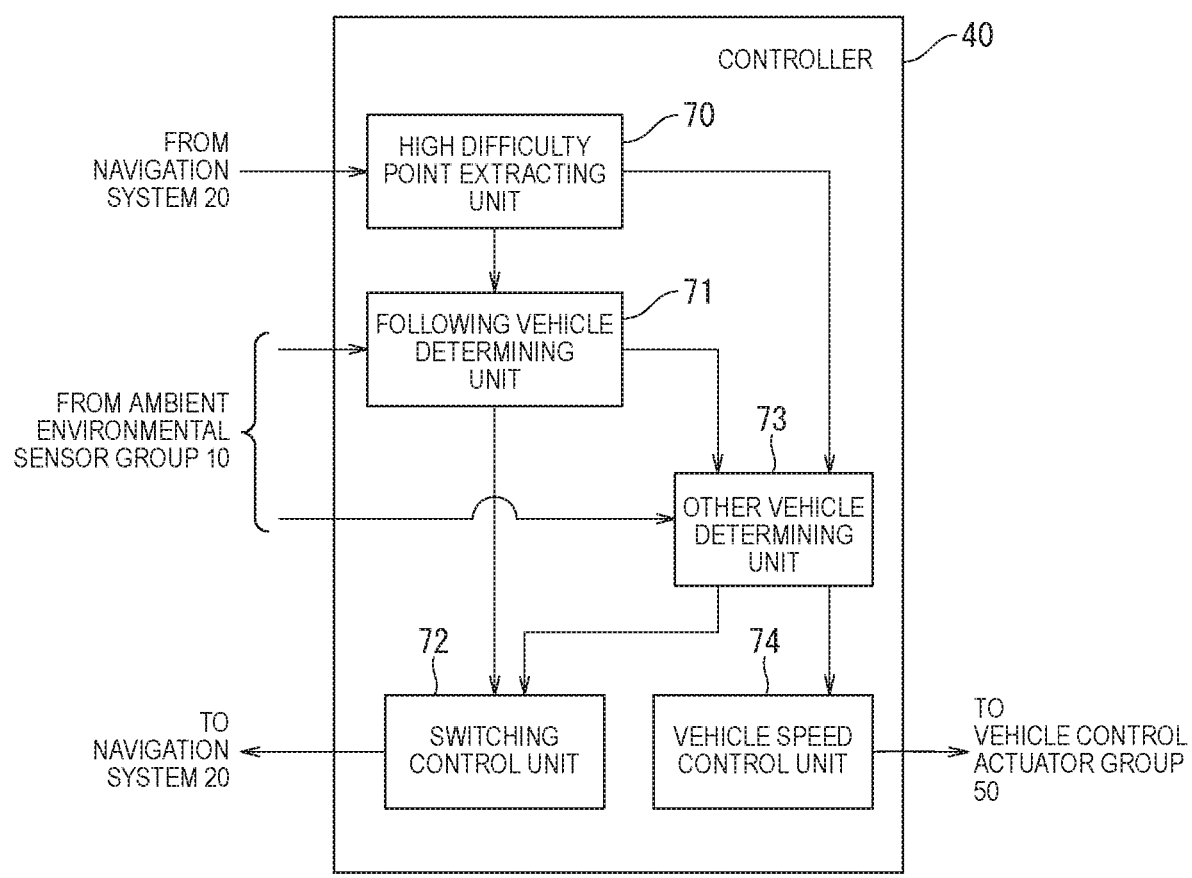

DRIVING ASSISTANCE METHOD AND DRIVING ASSISTANCE DEVICE

TECHNICAL FIELD

The present invention relates to a driving assistance method and a driving assistance device.

BACKGROUND

JP 2016-132421 A describes an automatic driving device that controls traveling of a host vehicle such that when control of merging traveling is determined to be impossible, the host vehicle stops, on a travel lane where the host vehicle is traveling, toward a boundary line between the travel lane and a merging destination lane at a merging location.

SUMMARY

When a host vehicle traveling under autonomous driving control is autonomously stopped on a high difficulty point where autonomous driving is difficult (for example, a point with high difficulty in autonomous driving), the driver of the host vehicle may feel discomfort due to approach of a following vehicle to the host vehicle.

For example, when the autonomously traveling host vehicle merges onto a congested main lane, if the autonomous driving control determines that it is impossible to cut in front of another vehicle on the main lane and then autonomously stops the host vehicle, a following vehicle will approach the host vehicle, which may cause discomfort to the driver of the host vehicle.

It is an object of the present invention to reduce discomfort to a driver due to approach of a following vehicle on a high difficulty point where autonomous driving is difficult.

According to one aspect of the present invention, there is provided a driving assistance method including: extracting a high difficulty point where autonomous driving is difficult on a planned travel route of a host vehicle; determining, at a point located at a predetermined distance or more before the high difficulty point, whether or not a following vehicle traveling on the same lane as a lane of the host vehicle is present within a predetermined range from the host vehicle; and guiding switching of a traveling state of the host vehicle from autonomous driving to manual driving when the following vehicle is present within the predetermined range from the host vehicle.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 3 is a block diagram illustrating one example of a functional structure of a controller included in FIG. 1;

DETAILED DESCRIPTION

Hereinafter, embodiments of the present invention will be described with reference to the drawings.

First Embodiment (Structure).

Figure 1:
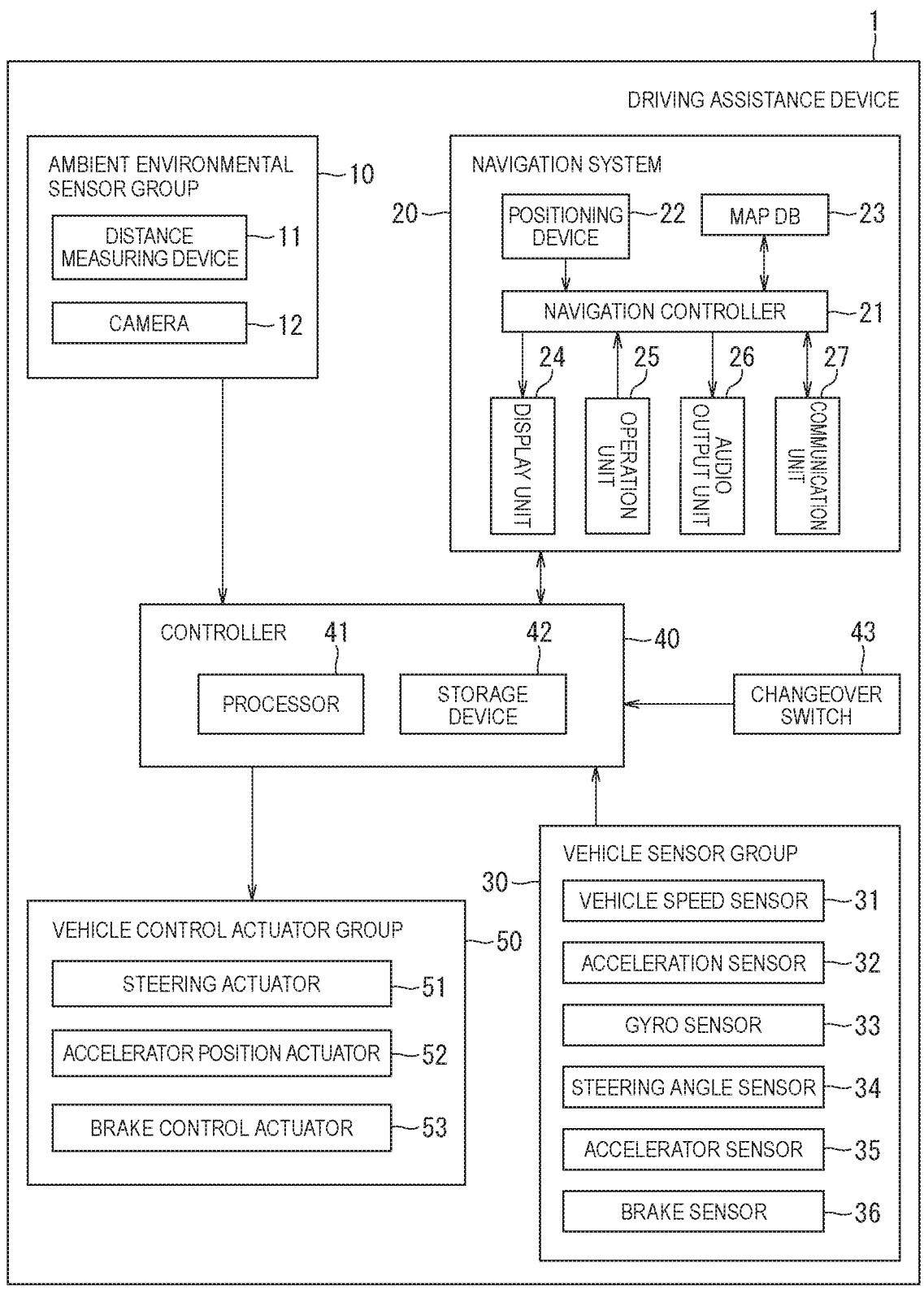
FIG. 1 is a diagram illustrating a schematic structural example of a driving assistance device of an embodiment.

Reference will be made to FIG. 1. A driving assistance device 1 performs travel assistance control, on a basis of a traveling environment around a vehicle (hereinafter referred to as "host vehicle") incorporating the driving assistance device 1, to autonomously steer and stop the host vehicle, and performs autonomous driving control to autonomously drive the host vehicle without any driver intervention.

The driving assistance device 1 includes an ambient environmental sensor group 10, a navigation system 20, a vehicle sensor group 30, a controller 40, a changeover switch 43, and a vehicle control actuator group 50.

The ambient environmental sensor group 10 is a sensor group configured to detect an ambient environment of the host vehicle, for example, objects around the host vehicle. The ambient environmental sensor group 10 may include a distance measuring device 11 and a camera 12. The distance measuring device 11 and the camera 12 detect ambient environments, such as objects present around the host vehicle, relative positions between the vehicle and the objects, and distances between the vehicle and the objects.

The distance measuring device 11 may be, for example, a laser range-finder (LRF) or a radar.

The camera 12 may be, for example, a stereo camera. The camera 12 may be a single-eye camera, in which the same object may be photographed by the single-eye camera at a plurality of viewpoints to calculate a distance to the object.

The distance measuring device 11 and the camera 12 output ambient environment information that is information of the detected ambient environments to the controller 40.

The navigation system 20 recognizes a current position of the host vehicle and road map information at the current position. The navigation system 20 sets a travel route to a destination input by a vehicle occupant, and provides the occupant with route guidance according to the travel route. Furthermore, the navigation system 20 outputs information of the set travel route to the controller 40. When a traveling state of the host vehicle is an autonomous driving mode, the controller 40 autonomously drives the host vehicle such that the host vehicle travels along the travel route set by the navigation system 20.

The navigation system 20 includes a navigation controller 21, a positioning device 22, a map database 23, a display unit 24, an operation unit 25, an audio output unit 26, and a communication unit 27. Note that, in FIG. 1, the map database is represented as map DB.

The navigation controller 21 is an electronic control unit configured to control information processing operation of the navigation system 20. The navigation controller 21 includes a processor and peripheral components thereof.

The processor may be, for example, a central processing unit (CPU) or a micro-processing unit (MPU).

The peripheral components include a storage device and the like. The storage device may include any of a semiconductor storage device, a magnetic storage device, and an optical storage device. The storage device may include memories, such as register, cache memory, and read only memory (ROM) and random access memory (RAM) used as primary storage.

The positioning device 22 measures the current position of the host vehicle. The positioning device 22 may be, for example, a global positioning system (GPS) receiver. Additionally, the positioning device 22 may measure the current position of the host vehicle on the basis of a satellite signal of another satellite positioning system, such as a global navigation satellite system (GLONASS). Alternatively, the positioning device 22 may be an inertial navigation device.

The map database 23 stores road map data. The road map data includes information regarding road line types, road shapes, slopes, the number of lanes, legal speeds (speed limits), the presence or absence of junctions, and the like. The road line types include, for example, ordinary roads and highways.

In the navigation system 20, the display unit 24 outputs various pieces of visual information. For example, the display unit 24 may display a map screen around the host vehicle and guidance on a recommended route.

In the navigation system 20, the operation unit 25 receives operation by a vehicle occupant. The operation unit 25 may be, for example, a button, a dial, a slider, or the like, or may be a touch panel provided on the display unit 24. For example, the operation unit 25 may receive a destination input operation and an operation for switching the display screen of the display unit 24 by the vehicle occupant.

The audio output unit 26 outputs various pieces of audio information in the navigation system 20. The audio output unit 26 may output guidance on driving on the basis of the set travel route and road guidance information on the basis of road map data around the host vehicle.

The communication unit 27 performs wireless communication with a communication device outside the host vehicle. A communication system by the communication unit 27 may be, for example, wireless communication by a public mobile phone network, vehicle-to-vehicle communication, road-to-vehicle communication, or satellite communication.

The vehicle sensor group 30 includes sensors configured to detect the traveling state of the vehicle and sensors configured to detect driving operation performed by the driver.

The sensors configured to detect the traveling state of the vehicle include a vehicle speed sensor 31, an acceleration sensor 32, and a gyro sensor 33.

The sensors configured to detect driving operation include a steering angle sensor 34, an accelerator sensor 35, and a brake sensor 36.

The vehicle speed sensor 31 detects a wheel speed of the host vehicle, and calculates the speed of the host vehicle on the basis of the wheel speed.

The acceleration sensor 32 detects an acceleration in a longitudinal direction of the host vehicle, an acceleration in a vehicle widthwise direction thereof, and an acceleration in a vertical direction thereof.

The gyro sensor 33 detects an angular velocity of a rotation angle of the host vehicle about three axes including a roll axis, a pitch axis, and a yaw axis.

The steering angle sensor 34 detects a current steering angle that is a current rotation angle (steering operation amount) of a steering wheel serving as a steering operation element.

The accelerator sensor 35 detects an accelerator position of the vehicle. For example, the accelerator sensor 35 detects, as the accelerator position, a depression amount of an accelerator pedal of the vehicle.

The brake sensor 36 detects an amount of brake operation by the driver. For example, the brake sensor 36 detects, as the amount of brake operation, a depression amount of a brake pedal of the vehicle.

Information regarding the speed, acceleration, angular velocity, steering angle, accelerator position, and brake operation amount of the host vehicle detected by the respective sensors of the vehicle sensor group 30 is collectively referred to as "vehicle information". The vehicle sensor group 30 outputs the vehicle information to the controller 40.

The controller 40 is an electronic control unit configured to perform driving control of the host vehicle. The controller 40 includes a processor 41 and peripheral components such as a storage device 42. The processor 41 may be, for example, a CPU or an MPU.

The storage device 42 may include any of a semiconductor storage device, a magnetic storage device, and an optical storage device. The storage device 42 may include memories such as register, cache memory, and ROM and RAM used as primary storage.

Note that the controller 40 may be realized by a functional logic circuit set in a general-purpose semiconductor integrated circuit. For example, the controller 40 may include a programmable logic device (PLD), such as a field-programmable gate array (FPGA), or the like.

In the autonomous driving mode where autonomous driving control of the host vehicle is executed, the controller 40 produces a travel trajectory that causes the host vehicle to travel on the travel route set by the navigation system 20, on the basis of the ambient environmental information input from the ambient environmental sensor group 10 and the vehicle information input from the vehicle sensor group 30.

The controller 40 drives the vehicle control actuator group 50 such that the host vehicle travels on the produced travel trajectory, thereby allowing the vehicle to autonomously travel.

The vehicle control actuator group 50 operates the steering wheel, accelerator position, and braking device of the vehicle in response to a control signal from the controller 40 to cause a vehicle behavior of the vehicle to occur. The vehicle control actuator group 50 includes a steering actuator 51, an accelerator position actuator 52, and a brake control actuator 53.

The steering actuator 51 controls a steering direction and a steering amount of a steering of the vehicle.

The accelerator position actuator 52 controls an accelerator position of the vehicle.

The brake control actuator 53 controls brake operation of the braking device of the vehicle.

In a manual driving mode, the controller 40 drives the vehicle control actuator group 50 in response to, for example, the steering angle, accelerator position, and brake operation amount detected by the vehicle sensor group 30 to cause a vehicle behavior in accordance with operation of the driver to occur.

With operation of the changeover switch 43, the driver can switch the traveling state of the host vehicle between the autonomous driving mode and the manual driving mode.

The controller 40 switches the traveling state of the host vehicle between the autonomous driving mode and the manual driving mode in response to operation of the changeover switch 43 by the driver.

In addition, when any of the steering wheel, the accelerator pedal, and the brake pedal is operated by the driver during autonomous driving, i.e., when overriding occurs, the controller 40 switches the traveling state of the host vehicle from the autonomous driving mode to the manual driving mode.

Furthermore, when there is a point where autonomous driving is difficult ahead of the host vehicle on a route where the host vehicle is planned to travel (for example, a travel route for autonomous driving) and also there is a following vehicle behind on the travel lane of the host vehicle, the controller 40 guides switching of the traveling state of the host vehicle from the autonomous driving mode to the manual driving mode.

Hereinafter, the route where the host vehicle is planned to travel may be referred to as "planned travel route". Additionally, the point where autonomous driving of the host vehicle is difficult (for example, a point where the host vehicle has high difficulty in autonomous driving) is referred to as "high difficulty point".

The high difficulty point may be, for example, a point where, depending on traffic conditions such as the degree of congestion, the difficulty of the autonomous driving of the host vehicle increases.

Figure 2:
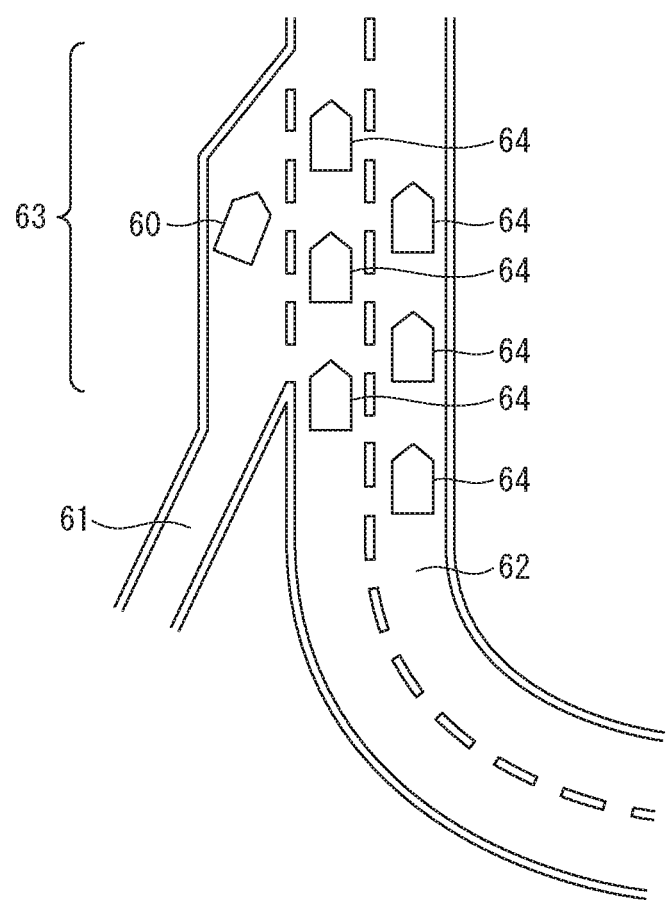
FIG. 2 is a diagram illustrating a first example of a high difficulty point.

For example, the high difficulty point includes a point where the travel lane of the host vehicle joins another lane. For example, the high difficulty point includes a merging zone 63 where a merging lane 61 that is the travel lane of a host vehicle 60 merges with a merging destination lane 62 at a merging location where a plurality of roads merges together, as illustrated in FIG. 2. Hereinafter, the merging destination lane is referred to as "main lane" in the present specification.

When the host vehicle 60 is about to enter the main lane 62 in congestion, as illustrated in FIG. 2, there are other vehicles 64, which are obstacles to entry of the host vehicle 60, on the main lane 62 in the merging zone 63. Due to the congestion, the plurality of other vehicles 64 is sequentially and continuously detected on the main lane 62, which makes it difficult to change lanes to the main lane 62 while autonomously driving.

In this case, when the host vehicle 60 is stopped by autonomous driving, the following vehicle traveling on the travel lane 61 approaches the host vehicle 60, which may cause discomfort to the driver of the host vehicle.

Thus, when there is a high difficulty point ahead of the host vehicle 60 on a planned travel route, and also a following vehicle traveling on the same lane as a lane of the host vehicle 60 (i.e., the merging lane 61) is present within a predetermined range from the host vehicle 60, the controller 40 guides switching from autonomous driving to manual driving before the high difficulty point. This enables the driver to manually drive the vehicle on the high difficulty point, so that it can be prevented that the host vehicle is stopped by autonomous driving on the high difficulty point and then approached by the following vehicle.

Next will be a description of a functional structure of the controller 40. Reference will be made to FIG. 3. The controller 40 includes a high difficulty point extracting unit 70, a following vehicle determining unit 71, a switching control unit 72, an other vehicle determining unit 73, and a vehicle speed control unit 74.

Functions of the high difficulty point extracting unit 70, the following vehicle determining unit 71, the switching control unit 72, the other vehicle determining unit 73, and the vehicle speed control unit 74 may be realized by causing the processor 41 of the controller 40 to execute a computer program stored in the storage device 42.

The high difficulty point extracting unit 70 acquires, from the navigation system 20, road map data of respective points on the planned travel route set by the navigation system 20. The high difficulty point extracting unit 70 extracts a high difficulty point present ahead of the host vehicle 60 on the planned travel route on the basis of the road map data acquired from the navigation system 20.

For example, the high difficulty point extracting unit 70 may extract, as a high difficulty point, a point where the travel lane of the host vehicle joins another lane.

For example, the point where the travel lane of the host vehicle joins another lane may include a point having a road shape where a plurality of lanes intersects with each other, such as an intersection. For example, the intersection may include a crossroads, a T-intersection, and the like.

In addition, for example, the point where the travel lane of the host vehicle joins another lane may include a point having a road shape where a plurality of lanes merges together. The high difficulty point extracting unit 70 may extract, for example, the merging zone 63 illustrated in FIG. 4A, as the point having the road shape where the plurality of lanes merges together.

The merging zone 63 is a merging zone where merging to the main lane 62 involves changing lanes from the merging lane 61 to the main lane 62.

Figure 4A:
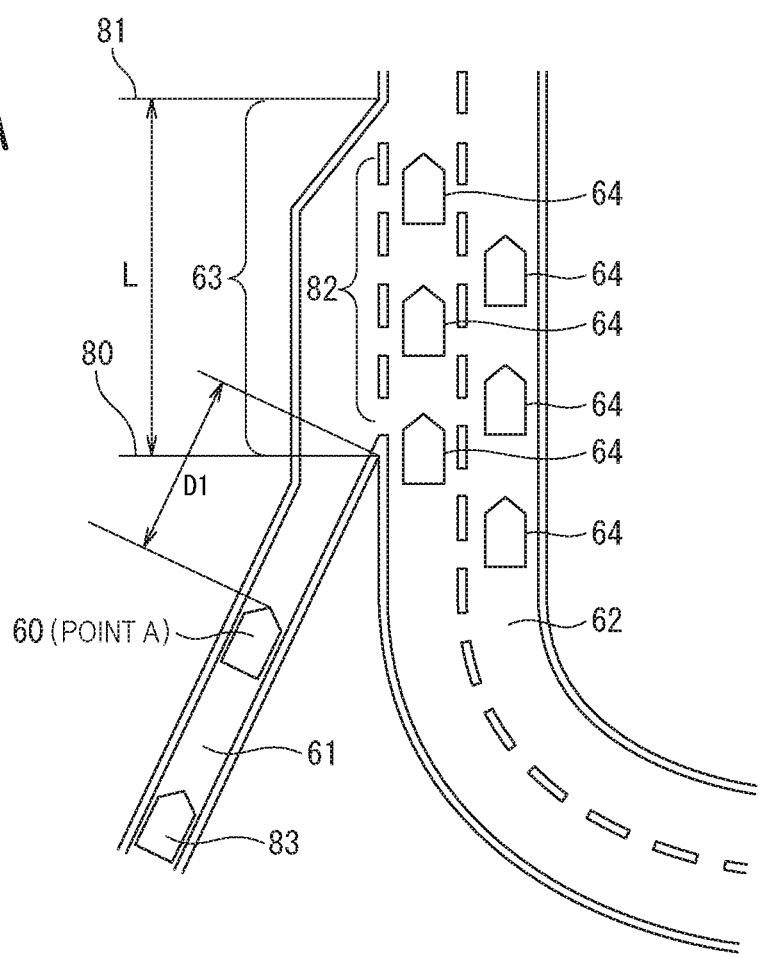
FIG. 4A is a diagram illustrating a first example of a merging zone that is a high difficulty point.
Figure 4B:
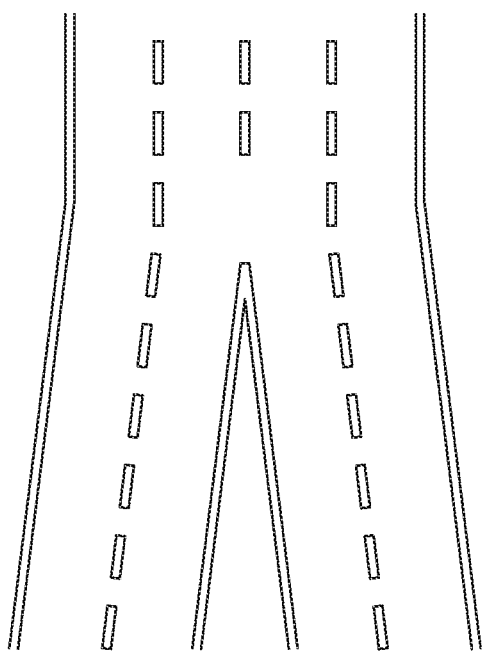
FIG. 4B is a diagram illustrating one example of a merging zone that is not a high difficulty point.

Among locations where a plurality of lanes merges together, there are those where no lane change is necessary on a merging point, as in a merging point illustrated in FIG. 4B. The high difficulty point extracting unit 70 may exclude the merging point illustrated in FIG. 4B from high difficulty points.

Reference will be made to FIG. 4A. The shorter the period of time during which the host vehicle 60 can stay in a zone from a starting point 80 of the merging zone 63 to an ending point 81 thereof, the less chance to make a lane change to the main lane 62, as a result of which merging to the main lane 62 becomes more difficult.

Thus, for example, the high difficulty point extracting unit 70 may extract the merging zone 63 as a high difficulty point when a distance L from the starting point 80 of the merging zone 63 to the ending point 81 thereof is below a threshold value.

The threshold value may be set to, for example, a distance in which merging can be tried substantially only once from the starting point 80. Alternatively, the threshold value may be set to a distance in which it is impossible to travel for three seconds or more after giving a turn signal in the merging zone 63.

Additionally, for example, the high difficulty point extracting unit 70 predicts the speed of the host vehicle 60 in the merging zone 63, and, on the basis of the predicted speed and the distance L, predicts travel time of the host vehicle 60 from the starting point 80 to the ending point 81. When the travel time is below a threshold value, the merging zone 63 may be extracted as a high difficulty point. The high difficulty point extracting unit 70 may predict the speed of the host vehicle 60 in the merging zone 63 on the basis of a legal speed limit in the merging zone 63 or on the basis of a current speed of the host vehicle 60.

Figure 5A:
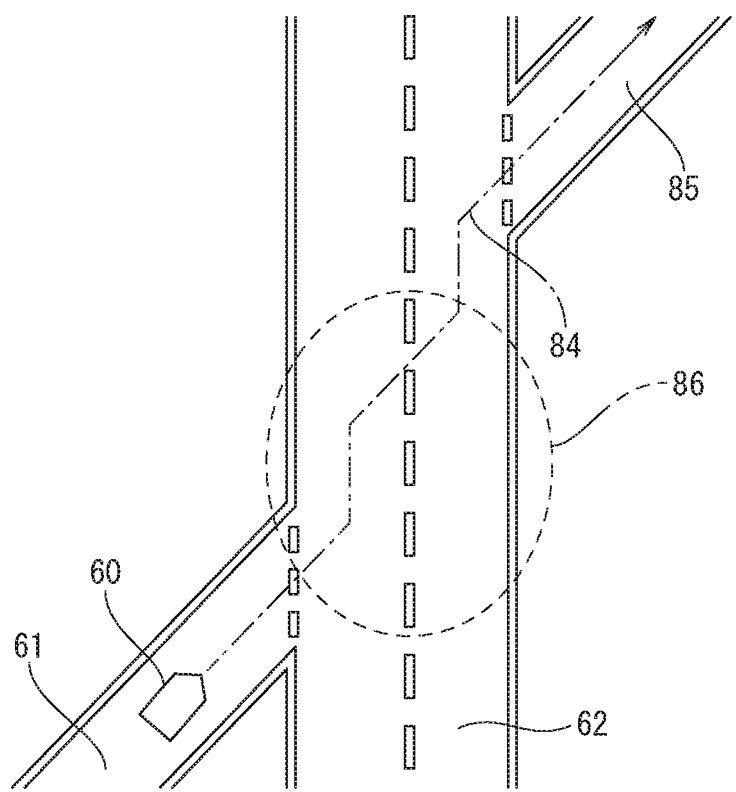
FIG. 5A is a diagram illustrating a second example of a high difficulty point.

Reference will be made to FIG. 5A. For example, the high difficulty point extracting unit 70 may extract, as a high difficulty point, a point where the planned travel route set by the navigation system 20 requires a lane change. A travel route 84 illustrated in FIG. 5A enters a plurality of lanes 62 from the lane 61, crosses the plurality of lanes 62, and then advances to a lane 85. Due to this, the travel route 84 requires a lane change in a zone indicated by a reference sign 86.

In addition, the high difficulty point extracting unit 70 may also extract, as a high difficulty point, not only the merging zone 63 where the merging lanes 61 and 62 are divided by a road dividing line (broken line) 82, as illustrated in FIG. 4A, but also a merging zone where a plurality of merging lanes is not divided by a road dividing line.

Figure 5B:
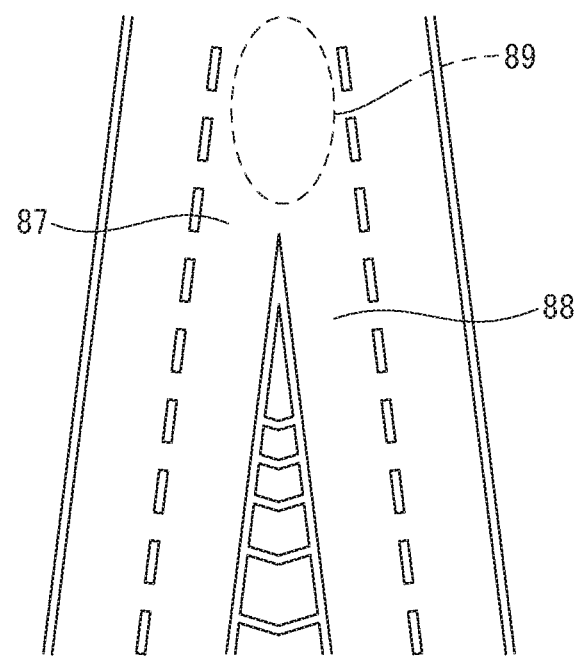
FIG. 5B is a diagram illustrating a second example of a merging zone that is a high difficulty point.

A merging zone 89 of FIG. 5B is an example of a merging zone where merging lanes 87 and 88 are not divided by a road dividing line.

Furthermore, the high difficulty point extracting unit 70 may extract, as a high difficulty point, a non-lane zone having a width corresponding to a plurality of lanes. One example of such a non-lane zone is a non-lane zone before a toll gate of a toll road.

Reference will be made to FIG. 3. When the host vehicle 60 approaches a point at a predetermined distance or more before the high difficulty point, the following vehicle determining unit 71 determines whether or not a following vehicle 83 traveling on the same lane 61 as that of the host vehicle 60 is present within a predetermined range from the host vehicle 60 (i.e., determines whether or not the following vehicle 83 is present within the predetermined range behind the host vehicle on the travel lane 61 of the host vehicle).

For example, in the example of the merging zone 63 illustrated in FIG. 4A, when the host vehicle 60 has reached a point A located at a first predetermined distance D1 or more before the starting point 80 of the merging zone 63, the presence or absence of the following vehicle 83 is confirmed.

The first predetermined distance D1 may be set to a length within a range of, for example, from 100 m to 300 m.

The following vehicle determining unit 71 determines whether or not the following vehicle 83 traveling on the same lane 61 as that of the host vehicle 60 is present within the predetermined range from the host vehicle 60 on the basis of a detection result regarding an object behind the host vehicle 60 by the distance measuring device 11 and the camera 12 of the ambient environmental sensor group 10.

The predetermined range for determining the presence or absence of the following vehicle 83 may be, for example, a range in which an inter-vehicle distance between the host vehicle 60 and the following vehicle 83 is below a predetermined distance.

The predetermined range for determining the presence or absence of the following vehicle 83 may be, for example, a range in which an inter-vehicle time or a time-to-collision (TTC) between the host vehicle 60 and the following vehicle 83 is below a predetermined travel time.

Additionally, the following vehicle determining unit 71 may determine the presence or absence of the following vehicle 83 on the basis of vehicle-to-vehicle communication or road-to-vehicle communication by the communication unit 27 of the navigation system 20 in addition to or instead of the distance measuring device 11 and the camera 12.

Note that it may be difficult to recognize the following vehicle 83 at a point at the first predetermined distance D1 before the high difficulty point.

Figure 6:
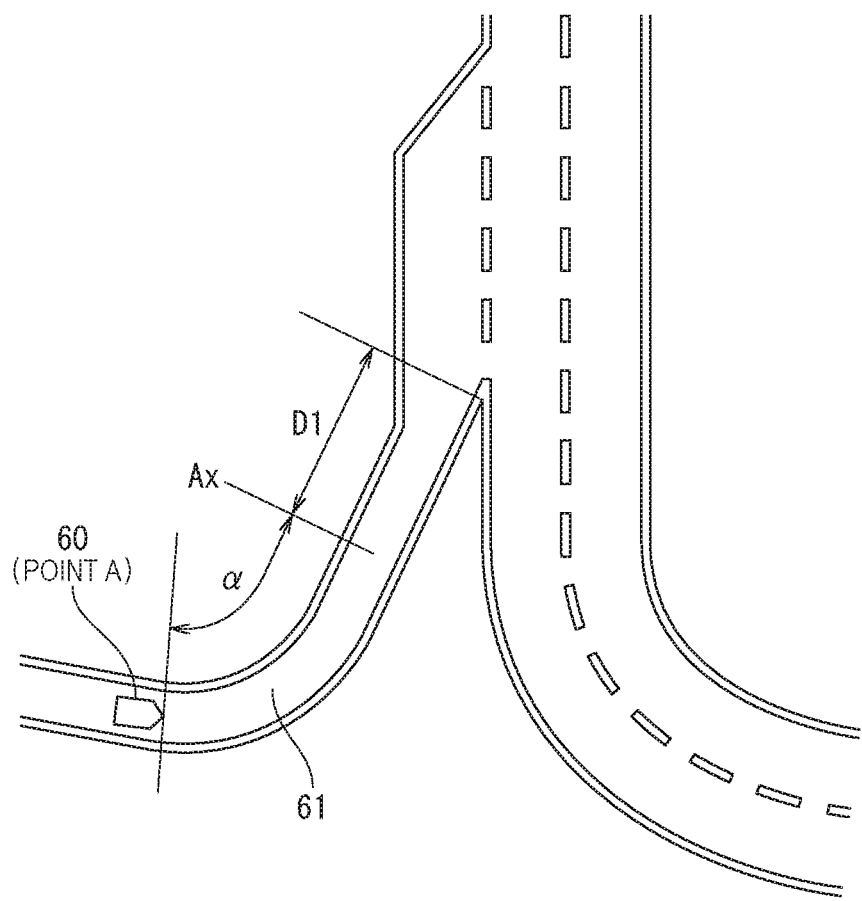
FIG. 6 is a diagram depicting one example of a point A where a following vehicle is recognizable.

For example, as illustrated in FIG. 6, when a point Ax at the first predetermined distance D1 before the high difficulty point is located between a curved zone of the travel lane 61 and the high difficulty point, visibility behind the host vehicle at the point Ax is reduced, which may make it difficult for the distance measuring device 11 and the camera 12 to detect the following vehicle 83.

Due to that, on the basis of the road map data acquired from the navigation system 20, the following vehicle determining unit 71 may specify the point A that is located at the first predetermined distance D1 or more before the high difficulty point and where the following vehicle 83 is recognizable.

In the example of FIG. 6, the following vehicle 83 within the predetermined range behind the host vehicle 60 on the travel lane 61 of the host vehicle 60 can be recognized at the point A that is located at the first predetermined distance D1+α before the high difficulty point.

The following vehicle determining unit 71 may determine whether or not the following vehicle 83 traveling on the same lane 61 as that of the host vehicle 60 is present within the predetermined range from the host vehicle 60 at the point A located at the first predetermined distance D1+α before the high difficulty point, i.e., at the point A that is located at the first predetermined distance D1 or more before the high difficulty point and where the following vehicle 83 within the predetermined range behind the host vehicle 60 on the travel lane 61 is recognizable.

Reference will be made to FIG. 3. The following vehicle determining unit 71 outputs a determination result regarding the presence or absence of the following vehicle 83 to the switching control unit 72 and the other vehicle determining unit 73.

When the following vehicle 83 traveling on the same lane 61 as that of the host vehicle 60 is present within the predetermined range from the host vehicle 60, the switching control unit 72 guides switching of the traveling state of the host vehicle 60 from the autonomous driving mode to the manual driving mode.

For example, the switching control unit 72 may output, from the audio output unit 26 of the navigation system 20, an audio guidance message for prompting the driver to switch the traveling state of the host vehicle 60 from the autonomous driving mode to the manual driving mode by operating the changeover switch 43.

Alternatively, for example, the switching control unit 72 may output, from the audio output unit 26, an audio guidance message for prompting the driver to switch the traveling state of the host vehicle 60 from the autonomous driving mode to the manual driving mode by operating any of the steering wheel, the accelerator pedal, or the brake pedal.

Alternatively, for example, the switching control unit 72 may display, on the display unit 24 of the navigation system 20, a visual guidance message for prompting the driver to switch the traveling state of the host vehicle 60 from the autonomous driving mode to the manual driving mode by operating the changeover switch 43.

Alternatively, for example, the switching control unit 72 may display, on the display unit 24, a visual guidance message for prompting the driver to switch the traveling state of the host vehicle 60 from the autonomous driving mode to the manual driving mode by operating any of the steering wheel, the accelerator pedal, or the brake pedal.

Alternatively, the switching control unit 72 may output, from the audio output unit 26 or the display unit 24, an audio guidance message or a visual guidance message for notifying the driver that the traveling state of the host vehicle 60 will be autonomously switched from the autonomous driving mode to the manual driving mode.

Figure 7:
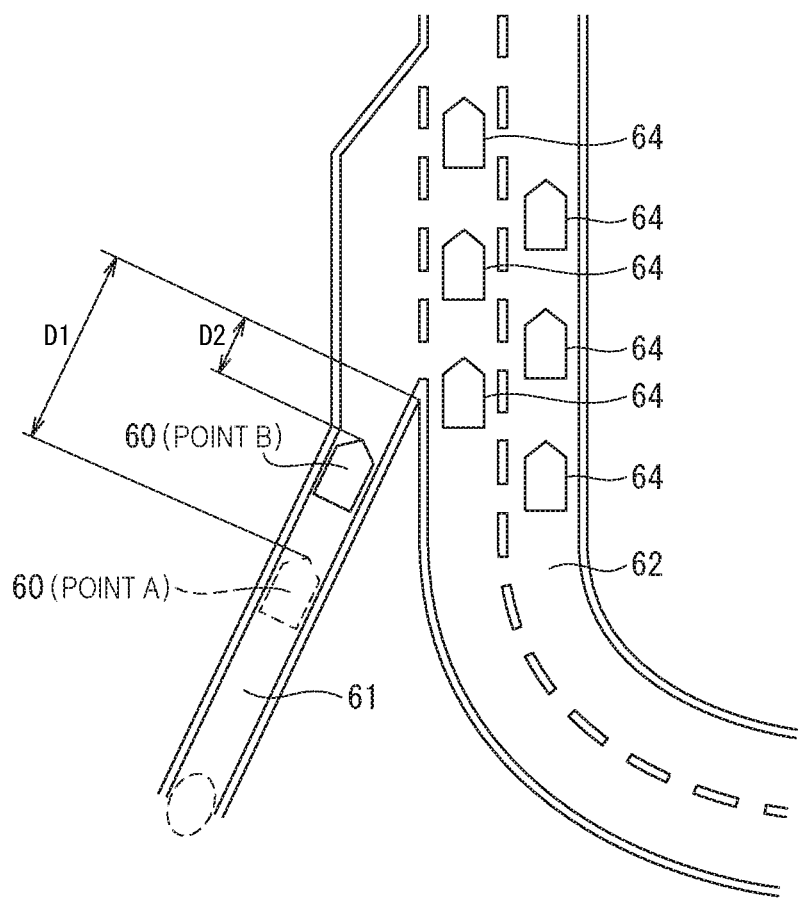
FIG. 7 is a diagram depicting one example of operation in a case where there is no following vehicle and a main lane is congested.

When the following vehicle 83 traveling on the same lane 61 as that of the host vehicle 60 is not present within the predetermined range from the host vehicle 60, the switching control unit 72 continues autonomous driving to a point B located at a second predetermined distance D2 before the high difficulty point, as illustrated in FIG. 7.

The point B is a point where the host vehicle 60 can determine whether or not any other vehicle 64 being an obstacle to traveling of the host vehicle 60 is present on the high difficulty point, and the second predetermined distance D2 is shorter than the first predetermined distance D1.

Note that the vehicle speed control unit 74 does not have to decelerate the host vehicle 60 in a zone from the point A to the point B.

Reference will be made to FIG. 3. When the host vehicle 60 has reached the point B, the other vehicle determining unit 73 determines whether or not any other vehicle 64 being an obstacle to traveling of the host vehicle 60 is present on the high difficulty point, on the basis of a detection result regarding objects around the host vehicle 60 by the distance measuring device 11 and the camera 12 of the ambient environmental sensor group 10. The presence or absence of the other vehicle 64 may be determined on the basis of vehicle-to-vehicle communication or road-to-vehicle communication by the communication unit 27, in addition to or instead of the distance measuring device 11 and the camera 12.

For example, when the main lane 62 is in congestion, as illustrated in FIG. 7, and any of the other vehicles 64 on the main lane 62 is an obstacle to entry of the host vehicle 60 onto the main lane 62, the other vehicle determining unit 73 determines that the other vehicle 64 being an obstacle to traveling of the host vehicle 60 is present on the high difficulty point.

Figure 8:
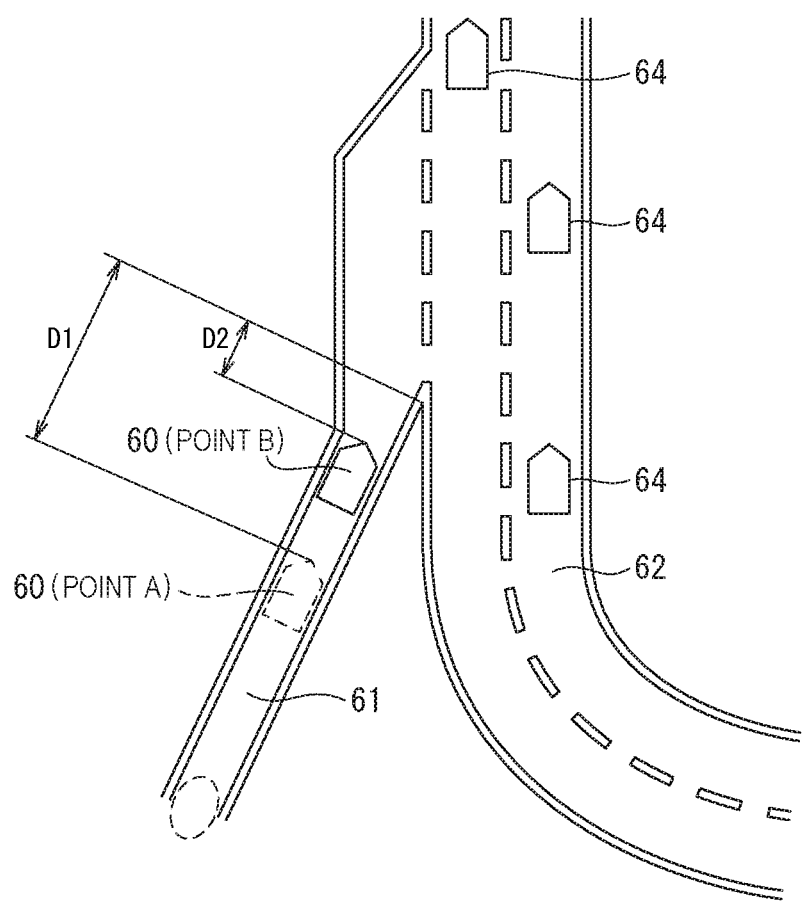
FIG. 8 is a diagram depicting one example of a case where there is no following vehicle and the main lane is not congested.

On the other hand, when the main lane 62 is not in congestion, as illustrated in FIG. 8, and none of the other vehicles 64 on the main lane 62 is an obstacle to entry of the host vehicle 60 onto the main lane 62, the other vehicle determining unit 73 determines that there is no other vehicle 64 being an obstacle to traveling of the host vehicle 60 on the high difficulty point.

Reference will be made to FIG. 3. The other vehicle determining unit 73 outputs the determination result to the switching control unit 72 and the vehicle speed control unit 74.

When there is no other vehicle 64 being an obstacle to traveling of the host vehicle 60 on the high difficulty point, the switching control unit 72 continues autonomous driving, and causes the host vehicle 60 to autonomously travel on the high difficulty point. For example, the host vehicle is caused to change lanes from the travel lane (merging lane) 61 to the main lane 62 by autonomous driving.

When there is the other vehicle 64 being an obstacle to traveling of the host vehicle 60 on the high difficulty point, the driver causes the host vehicle 60 to manually travel on the high difficulty point.

In this case, the vehicle speed control unit 74 decelerates the host vehicle 60. During the deceleration of the host vehicle 60 by the vehicle speed control unit 74, the switching control unit 72 guides switching from the autonomous driving mode to the manual driving mode. Thus, the controller 40 guides switching from the autonomous driving mode to the manual driving mode while decelerating the host vehicle 60.

For example, the switching control unit 72 may output a guidance message for prompting the driver to switch the traveling state of the host vehicle 60 from the autonomous driving mode to the manual driving mode through operation by the driver.

Alternatively, the switching control unit 72 may output a guidance message for notifying the driver that the traveling state of the host vehicle 60 will be autonomously switched from the autonomous driving mode to the manual driving mode.

(Operation)

Figure 9:
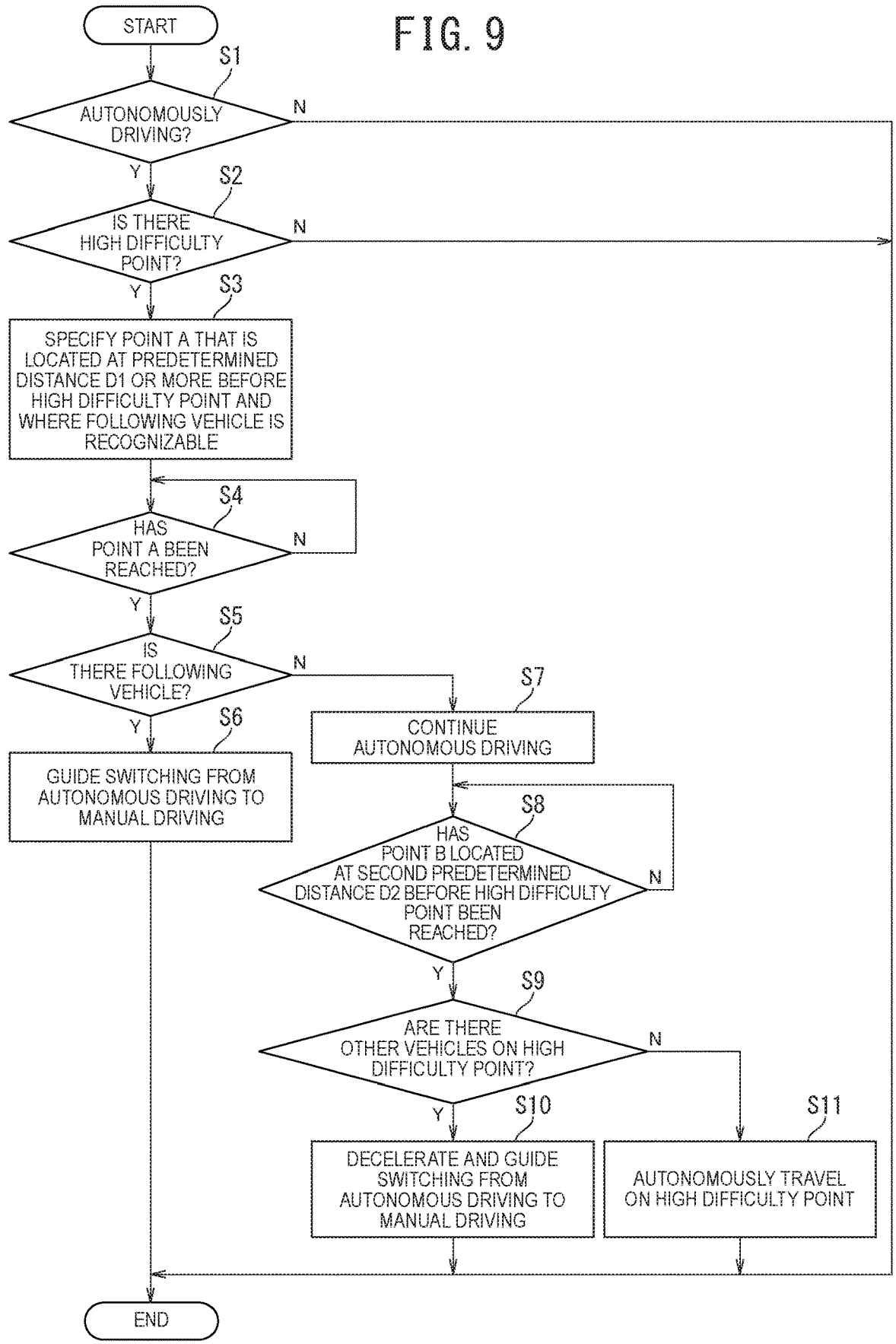
FIG. 9 is a flowchart illustrating a driving assistance method of an embodiment.

Next, one example of operation of the driving assistance device 1 will be described. Reference will be made to FIG. 9.

At step S1, the high difficulty point extracting unit 70 determines whether the host vehicle 60 is autonomously driving or not. When the host vehicle 60 is autonomously driving (step S1: Y), processing will proceed to step S2 to determine whether or not there is any point where autonomous driving is difficult ahead of a planned travel route. When the host vehicle 60 is not autonomously driving (step S1: N), the processing will end.

At step S2, the high difficulty point extracting unit 70 determines whether or not there is a high difficulty point where autonomous driving is difficult ahead of the planned travel route. When there is a high difficulty point (step S2: Y), the processing will proceed to step S3 to determine whether switching to manual driving is necessary or not. When there is no high difficulty point (step S2: N), the processing will end.

At step S3, the following vehicle determining unit 71 specifies the point A that is located at the predetermined distance D1 or more before the high difficulty point and where a following vehicle is recognizable. This is to determine the presence or absence of a following vehicle at the point A located before the high difficulty point, and thereby determine necessity of switching to manual driving.

At step S4, the following vehicle determining unit 71 determines whether or not the host vehicle 60 has reached the point A. When the host vehicle 60 has reached the point A (step S4: Y), the processing will proceed to step S5. When the host vehicle 60 has not reached the point A yet (step S4: N), the processing will return to step S4.

At step S5, the following vehicle determining unit 71 determines at the point A whether or not the following vehicle 83 traveling on the same lane 61 as that of the host vehicle 60 is present within the predetermined range from the host vehicle 60. When the following vehicle is present (step S5: Y), the processing will proceed to step S6. When no following vehicle is present (step S5: N), the processing will proceed to step S7.

At step S6, the switching control unit 72 guides switching of the traveling state of the host vehicle 60 from the autonomous driving mode to the manual driving mode. This is to reduce discomfort to the driver caused due to approach of the following vehicle to the host vehicle 60 stopped on the high difficulty point by autonomous driving, by switching the traveling state of the host vehicle 60 to the manual driving mode.

When no following vehicle is present (step S5: N), the switching control unit 72 continues autonomous driving at step S7.

At step S8, the other vehicle determining unit 73 determines whether or not the host vehicle 60 has reached the point B located at the second determined distance D2 before the high difficulty point. This is to determine, before the high difficulty point, whether or not any other vehicle being an obstacle to autonomous driving is present on the high difficulty point.

When the host vehicle 60 has reached the point B (step S8: Y), the processing will proceed to step S9. When the host vehicle 60 has not reached the point B yet (step S8: N), the processing will return to step S8.

At step S9, to determine whether or not it is necessary to cause the host vehicle 60 to manually travel on the high difficulty point, the other vehicle determining unit 73 determines whether or not one or more other vehicles 64 being obstacles to traveling of the host vehicle 60 are present on the high difficulty point. When one or more other vehicles 64 are present (step S9: Y), the processing will proceed to step S10. When there is no other vehicle 64 (step S9: N), the processing will proceed to step S11.

At step S10, the vehicle speed control unit 74 decelerates the host vehicle 60. Additionally, the switching control unit 72 guides switching from the autonomous driving mode to the manual driving mode. Then, the processing will end.

At step S11, the switching control unit 72 continues autonomous driving to cause the host vehicle 60 to autonomously travel on the high difficulty point. Then, the processing will end.

Effects of Embodiment (1) The high difficulty point extracting unit 70 extracts a high difficulty point where autonomous driving is difficult on a planned travel route of the host vehicle 60. When the host vehicle 60 approaches the point A located at the first predetermined distance D1 or more before the high difficulty point, the following vehicle determining unit 71 determines whether or not a following vehicle traveling on the same lane as that of the host vehicle 60 is present within a predetermined range from the host vehicle. When the following vehicle is present within the predetermined range from the host vehicle 60, the switching control unit 72 guides switching of the traveling state of the host vehicle 60 from autonomous driving to manual driving.

This can reduce discomfort to the driver due to approach of the following vehicle caused when the host vehicle 60 is autonomously stopped by autonomous driving on the high difficulty point where autonomous driving is difficult.

(2) The high difficulty point may be a point where the travel lane 61 of the host vehicle joins another lane (for example, a point having a road shape where lanes merge or intersect). Depending on traffic conditions such as the degree of congestion, autonomous driving may be difficult on the point where the travel lane 61 joins the other lane, due to the presence of the other vehicle 64 traveling on the other lane joining the travel lane 61. Extracting, as a high difficulty point, the point where the travel lane 61 joins the other lane enables reduction of discomfort to the driver due to approach of a following vehicle caused when the host vehicle 60 is stopped by autonomous driving on such a point.

(3) The high difficulty point may be a merging zone involving a lane change, which may be a merging zone where the distance or travel time from the starting point of the merging zone to the ending point thereof is shorter than a threshold value. Since there is less chance to make a lane change in the short merging zone, autonomous driving becomes difficult depending on traffic conditions such as the degree of congestion. Extracting, as a high difficulty point, the short merging zone involving a lane change can reduce discomfort to the driver due to approach of a following vehicle caused when the host vehicle 60 is autonomously stopped by autonomous driving in such a merging zone.

(4) The high difficulty point may be a non-lane zone having a width corresponding to a plurality of lanes. For example, traveling in the non-lane zone having the width corresponding to the plurality of lanes, such as a non-lane zone before the toll gate of a toll road, requires driving operation for cutting in front of another vehicle depending on traffic conditions, so that autonomous driving is difficult. Extracting, as a high difficulty point, the non-lane zone having the width corresponding to the plurality of lanes can reduce discomfort to the driver due to approach of a following vehicle caused when the host vehicle 60 is autonomously stopped by autonomous driving in such a non-lane zone.

(5) When there is no following vehicle within the predetermined range, the switching control unit 72 continues autonomous driving to the point B located at the second predetermined distance D2 before the high difficulty point. When the host vehicle 60 has reached the point B located at the second predetermined distance before the high difficulty point, the other vehicle determining unit 73 determines whether or not one or more other vehicles are present on the high difficultly point. When there are one or more other vehicles on the high difficulty point, the vehicle speed control unit 74 decelerates the host vehicle, and the switching control unit 72 guides switching of the traveling state of the host vehicle 60 from autonomous driving to manual driving.

Thus, when there are one or more other vehicles on the high difficulty point, switching to manual driving is guided, which can reduce discomfort to the driver due to approach of a following vehicle caused when the host vehicle 60 is autonomously stopped by autonomous driving on the high difficulty point.

Additionally, by guiding the switching while decelerating, the driver can afford to perform manual driving.

(6) When there is no other vehicle on the high difficulty point, the switching control unit 72 continues autonomous driving.

As a result, continuing autonomous driving when there is no other vehicle on the high difficulty point can reduce a driving load on the driver.

(7) At the point that is located at the first predetermined distance D1 or more before the high difficulty point and where a following vehicle is recognizable, the following vehicle determining unit 71 determines whether or not there is any following vehicle within the predetermined range.

Thus, for example, even if there is a point where it is difficult to recognize a following vehicle due to the road shape of the travel lane of the host vehicle 60, the presence of the following vehicle can be recognized at the point located at the first predetermined distance D1 or more before the high difficulty point.

(8) The switching control unit 72 switches the traveling state of the host vehicle from autonomous driving to manual driving when there is a following vehicle within the predetermined range.

This can reduce discomfort to the driver due to approach of the following vehicle caused when the host vehicle 60 is autonomously stopped by autonomous driving on the high difficulty point where autonomous driving is difficult.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Driving assistance device
10: Ambient environmental sensor group
11: Distance measuring device
12: Camera
20: Navigation system
21: Navigation controller
22: Positioning device
23: Map database
24: Display unit
25: Operation unit
26: Audio output unit
27: Communication unit
30: Vehicle sensor group
31: Vehicle speed sensor
32: Acceleration sensor
33: Gyro sensor
34: Steering angle sensor
35: Accelerator sensor
36: Brake sensor
40: Controller
41: Processor
42: Storage device
43: Changeover switch
50: Vehicle control actuator group
51: Steering actuator
52: Accelerator position actuator
53: Brake control actuator
70: High difficulty point extracting unit
71: Following vehicle determining unit
72: Switching control unit
73: Other vehicle determining unit 74: Vehicle speed control unit

The invention claimed is:

1. A driving assistance method comprising:
extracting a high difficulty point on a planned travel route of a host vehicle, where a travel lane of the host vehicle joins another lane;
determining a first predetermined point before the high difficulty point, located where the host vehicle can determine whether or not another vehicle is present on the another lane;
determining a second predetermined point before the first predetermined point;
determining, when the host vehicle reaches the second predetermined point, whether or not a following vehicle traveling on a same lane as a lane of the host vehicle is present within a predetermined range from the host vehicle; and
guiding switching of a traveling state of the host vehicle from autonomous driving to manual driving when the following vehicle is present within the predetermined range from the host vehicle.

2. The driving assistance method according to claim 1, wherein the high difficulty point is a merging zone involving changing lanes, such that a distance or a travel time from a starting point of the merging zone to an ending point thereof is shorter than a threshold value.

3. The driving assistance method according to claim 1, wherein the high difficulty point is a non-lane zone having a width corresponding to a plurality of lanes.

4. The driving assistance method according to claim 1, wherein when no following vehicle is present within the predetermined range, autonomous driving is continued to the first predetermined point before the high difficulty point, and it is determined, at the first predetermined point before the high difficulty point, whether or not there are one or more other vehicles on the high difficulty point, in which when there are the one or more other vehicles on the high difficulty point, the host vehicle is decelerated, and the switching of the traveling state from autonomous driving to manual driving is guided.

5. The driving assistance method according to claim 4, wherein when the one or more other vehicles are not on the high difficulty point, autonomous driving is continued.

6. The driving assistance method according to claim 1, further comprising, at the second predetermined point and where the following vehicle is recognizable, determining whether or not the following vehicle is present within the predetermined range.

7. The driving assistance method according to claim 1, wherein when there is a following vehicle within the predetermined range, the traveling state of the host vehicle is switched from autonomous driving to manual driving.

8. A driving assistance device comprising:
a sensor configured to detect an ambient environment of a host vehicle;
an actuator configured to realize at least one of driving, braking, and steering of the host vehicle; and
a controller configured to perform autonomous driving by controlling the actuator on a basis of a detection result of the sensor, wherein the controller is further configured to:
extract a high difficulty point on a planned travel route of the host vehicle, where a travel lane of the host vehicle joins another lane;
determine a first predetermined point before the high difficulty point, located where the host vehicle can determine whether or not another vehicle is present on the another lane;
determine a second predetermined point before the first predetermined point; and
determine, when the host vehicle reaches the second predetermined point whether or not a following vehicle traveling the same lane as a lane of the host vehicle is present within a predetermined range from the host vehicle; and
guide switching of a traveling state of the host vehicle from autonomous driving to manual driving when the following vehicle is present within the predetermined range from the host vehicle.

* * * * *